United States Patent
Annampedu et al.

(10) Patent No.: US 8,243,381 B2
(45) Date of Patent: Aug. 14, 2012

(54) SYSTEMS AND METHODS FOR SECTOR ADDRESS MARK DETECTION

(75) Inventors: Viswanath Annampedu, Bethlehem, PA (US); Venkatram Muddhasani, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 198 days.

(21) Appl. No.: 12/270,786

(22) Filed: Nov. 13, 2008

(65) Prior Publication Data

US 2010/0118690 A1  May 13, 2010

(51) Int. Cl.
G11B 5/09 (2006.01)
(52) U.S. Cl. .......................................... 360/51
(58) Field of Classification Search .................. None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Peter Vincent Agustin
*Assistant Examiner* — Emily Frank
(74) *Attorney, Agent, or Firm* — Hamilton, DeSanctis & Cha

(57) ABSTRACT

Various embodiments of the present invention provide systems and methods for sector address mark detection. As an example, data detection systems are disclosed that include a sector address mark detection circuit and a sector address mark quality detection circuit. The sector address mark detection circuit receives a data stream and identifies a sector address mark in the data stream. The sector address mark quality detection circuit receives a first sample and a second sample from the data stream corresponding to the sector address mark, and determines a quality of the sector address mark based at least in part on the first sample and the second sample. In various cases, one or more of the samples of the sector address mark up to all of the samples of the sector address mark may be used.

22 Claims, 6 Drawing Sheets

U.S. PATENT DOCUMENTS

| | | | |
|---|---|---|---|
| 6,208,478 B1 | 3/2001 | Chiu et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,947,233 B2 * | 9/2005 | Toda | 360/51 |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Anaampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,253,984 B1 | 8/2007 | Patapoutian et al. | |
| 7,301,717 B1 | 11/2007 | Lee et al. | |
| 7,308,057 B1 | 12/2007 | Patapoutian | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,620,101 B1 | 11/2009 | Jenkins | |
| 2001/0013989 A1 * | 8/2001 | Saiki et al. | 360/78.04 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 * | 12/2002 | Nagata et al. | 369/59.25 |
| 2003/0095350 A1 | 5/2003 | Annampedu et al. | |
| 2004/0179460 A1 * | 9/2004 | Furumiya et al. | 369/275.3 |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0071152 A1 | 3/2007 | Chen et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2008/0080082 A1 | 4/2008 | Erden et al. | |
| 2008/0212715 A1 | 9/2008 | Chang | |
| 2008/0247290 A1 * | 10/2008 | Kadowaki et al. | 369/53.22 |
| 2008/0266693 A1 | 10/2008 | Bliss et al. | |
| 2009/0002862 A1 | 1/2009 | Park | |
| 2009/0142620 A1 | 6/2009 | Yamamoto et al. | |

OTHER PUBLICATIONS

.Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR SECTOR ADDRESS MARK DETECTION

BACKGROUND OF THE INVENTION

The present inventions are related to detection of data in a communication system, and more particularly to detection of a sector address mark from a channel.

A read channel integrated circuit is a component of a magnetic storage device. In operation, a read channel component converts and encodes data to enable a read/write head assembly to write data to a disk and to subsequently read data back. In, for example, a hard disk drive, the disk typically includes many tracks containing encoded data that extend around the disk in a radial pattern. Each track includes one or more of user data regions as well as intervening servo data regions. The information of the servo data regions is used to position the read/write head assembly in relation to the disks so that the information stored in the user data regions may be retrieved accurately.

FIG. 1 shows a storage medium 100 with two exemplary tracks 150,155 indicated as dashed lines. The tracks are segregated by servo data written within wedges 160, 165. These wedges include data and supporting bit patterns 110 that are used for control and synchronization of the read/write head assembly over a desired location on storage medium 100. In particular, these wedges generally include a preamble pattern 152 followed by a sector address mark 154 (SAM). Sector address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information.

A servo search mode is typically included in existing magnetic recording systems that allows for detecting a servo data pattern embedded between user data regions of a storage medium. Once the servo search mode identifies a servo data pattern, a normal processing mode begins where the preamble is detected and a sampling clock is recovered based on the frequency and phase of the detected preamble. Using the recovered sampling clock, the subsequent servo address mark is detected, and a location thereof identified. The following Gray code data and burst demodulation information is processed based on a predicted distance from the location of the sector address mark.

In some cases, a pattern similar to the servo preamble is detected in the user data region and mistaken for the servo preamble. In such cases, the system may be improperly switched to normal mode where the succeeding data stream is continuously queried for the expected sector address mark. Where a servo preamble is errantly identified in user data region, the normal mode operation will either timeout because of an inability to identify a subsequent sector address mark, or worse, a pattern matching the sector address mark will be found causing the subsequent data to be improperly processed as Gray code and burst information fields. Among other things, this can result in problematic positioning errors of a read/write head assembly in relation to the storage medium.

Hence, for at least the aforementioned reasons, there exists a need in the art for advanced systems and methods for detecting and processing servo data.

BRIEF SUMMARY OF THE INVENTION

The present inventions are related to detection of data in a communication system, and more particularly to detection of a sector address mark from a channel.

Various embodiments of the present invention provide data detection systems that include a sector address mark detection circuit and a sector address mark quality detection circuit. The sector address mark detection circuit receives a data stream and identifies a sector address mark in the data stream. The sector address mark quality detection circuit receives a first sample and a second sample from the data stream corresponding to the sector address mark, and determines a quality of the sector address mark based at least in part on the first sample and the second sample. In some instances of the aforementioned embodiments, the sector address mark quality detection circuit includes a comparator that compares the first sample with a quality threshold to provide a first result, and compares the second sample with the quality threshold to provide a second result. In some such cases, a second comparator is included to compare a composite of the first result and the second result to another quality threshold. Based on the comparison of the composite result with the other quality threshold, a determination may be made about whether to accept the detected sector address mark. In some cases, the composite of the first result and the second result is an indication of the number of the first result and the second result that are at a defined state.

In some instances of the aforementioned embodiments, the data detection system further includes a preamble detection circuit that is operable to identify a preamble pattern in the data stream. Further, in some cases, the data detection system further includes a clock recovery circuit that is operable to adjust the phase of a sample clock based on the identified preamble pattern.

Other embodiments of the present invention provide methods for performing data detection. The methods include receiving a data stream, querying the data stream for a preamble pattern, detecting the preamble pattern in the data stream, detecting a sector address mark in the data stream, comparing the sector address mark against a quality threshold, and restarting the query for the preamble where the sector address mark is below the quality threshold. In some instances of the aforementioned embodiments, the sector address mark is above the quality threshold. In such instances, a subsequent portion of the data stream may be treated as servo data. Such servo data may include, for example, a Gray code pattern and burst information.

In some instances of the aforementioned embodiments, comparing the sector address mark against the quality threshold includes comparing a first sample from the data stream against the quality threshold to provide a first result, and comparing a second sample from the data stream against the quality threshold to provide a second result. In some such cases, a comparison of a composite of the first result and the second result is compared with another quality threshold. The composite result may be created by counting the number of the first result and the second result that are at a defined threshold.

Yet other embodiments of the present invention provide storage devices. Such storage devices include a storage medium with at least one sector address mark. An analog front end is included that is operable to sense information on the storage medium and to provide a series of digital samples corresponding to the information on the storage medium. A sector address mark detection circuit is included that receives the series of digital samples and identifies the sector address mark in the series of digital samples. A sector address mark quality detection circuit is included that receives a first sample and a second sample from the series of digital samples corresponding to the sector address mark, and determines a quality of the sector address mark based at least in part on the first sample and the second sample.

In some instances of the aforementioned embodiments, the sector address mark quality detection circuit includes a first comparator and a second comparator. The first comparator compares the first sample with a first quality threshold to provide a first result, and compares the second sample with the first quality threshold to provide a second result. The second comparator compares a composite of the first result and the second result with a second quality threshold. The composite of the first result and the second result includes an indication of the number of the first result and the second result that are at a defined state.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to detection of data in a communication system, and more particularly to detection of a sector address mark from a channel.

Various embodiments of the present invention provide for reducing the possibility of false detection of a sector address mark. Where a sector address mark is detected, the quality of the signal is checked to determine a likelihood that the sector address mark was falsely detected. Where the quality is sufficiently low, the identified sector address mark is rejected and the search mode is restarted. Otherwise, where the quality is acceptable the identified sector address mark is accepted and normal servo processing including Gray code and Burst information processing are performed. By rejecting falsely detected sector address marks using such quality determinations, external restart controls are not a necessity.

In some instances of the aforementioned embodiments, the sector address mark quality detecting process is carried out along with an asynchronous windowing technique to further limit the possibility of falsely detecting sector address marks. Such an asynchronous windowing approach is more fully discussed in US Pat. Pub. No. US2005/0243455 entitled "Method and Apparatus for Improved Address Mark Detection," and filed Apr. 30, 2004 by Annampedu. The entirety of the aforementioned publication is incorporated herein by reference for all purposes. Where a sector address mark is not found within an asynchronous window, the servo search is restarted. Alternatively, where a sector address mark is found within the asynchronous window, but its quality is too poor, the servo search is restarted. Only where a high quality sector address mark is found within the asynchronous window will normal processing of subsequent servo data be indicated.

Figure 1:
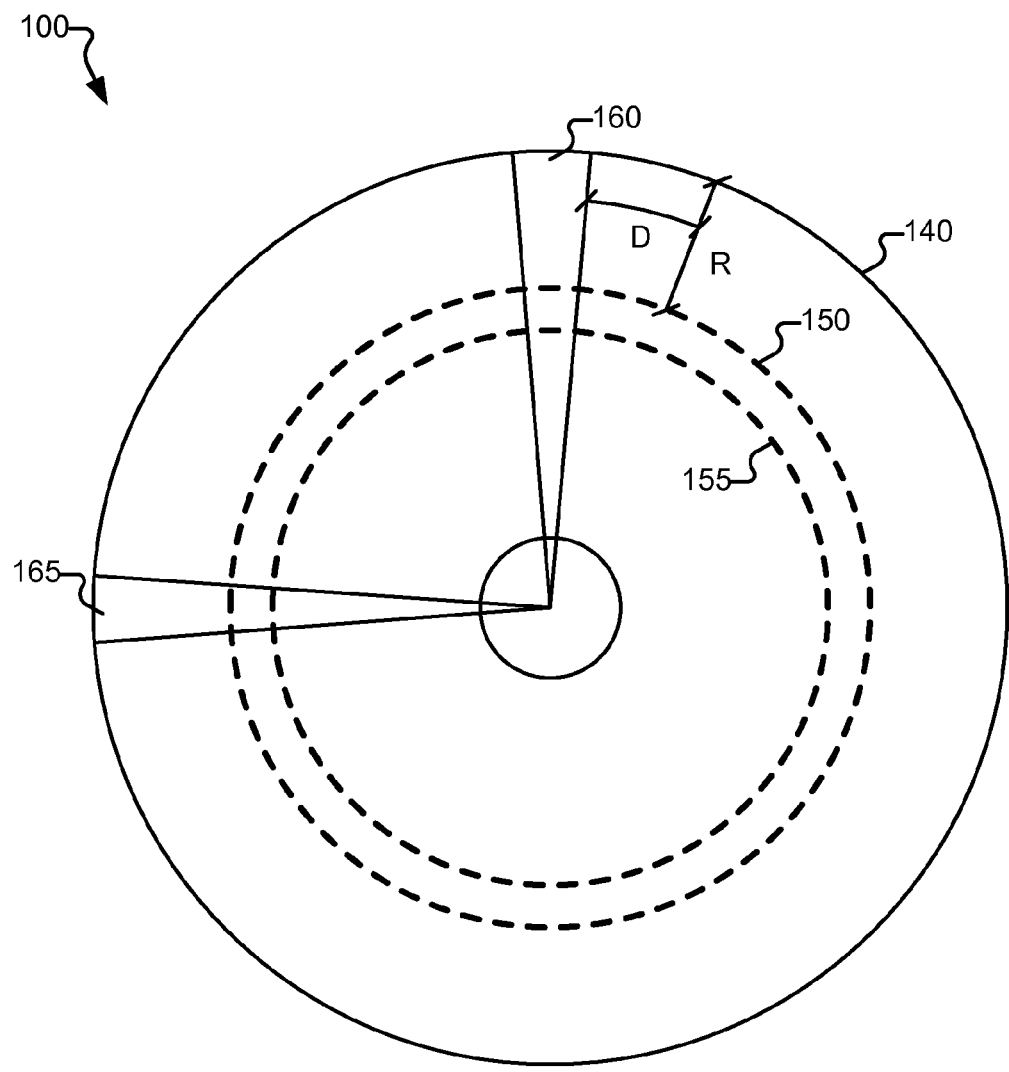
FIG. 1 depicts an existing storage medium including servo data.
Figure 2:
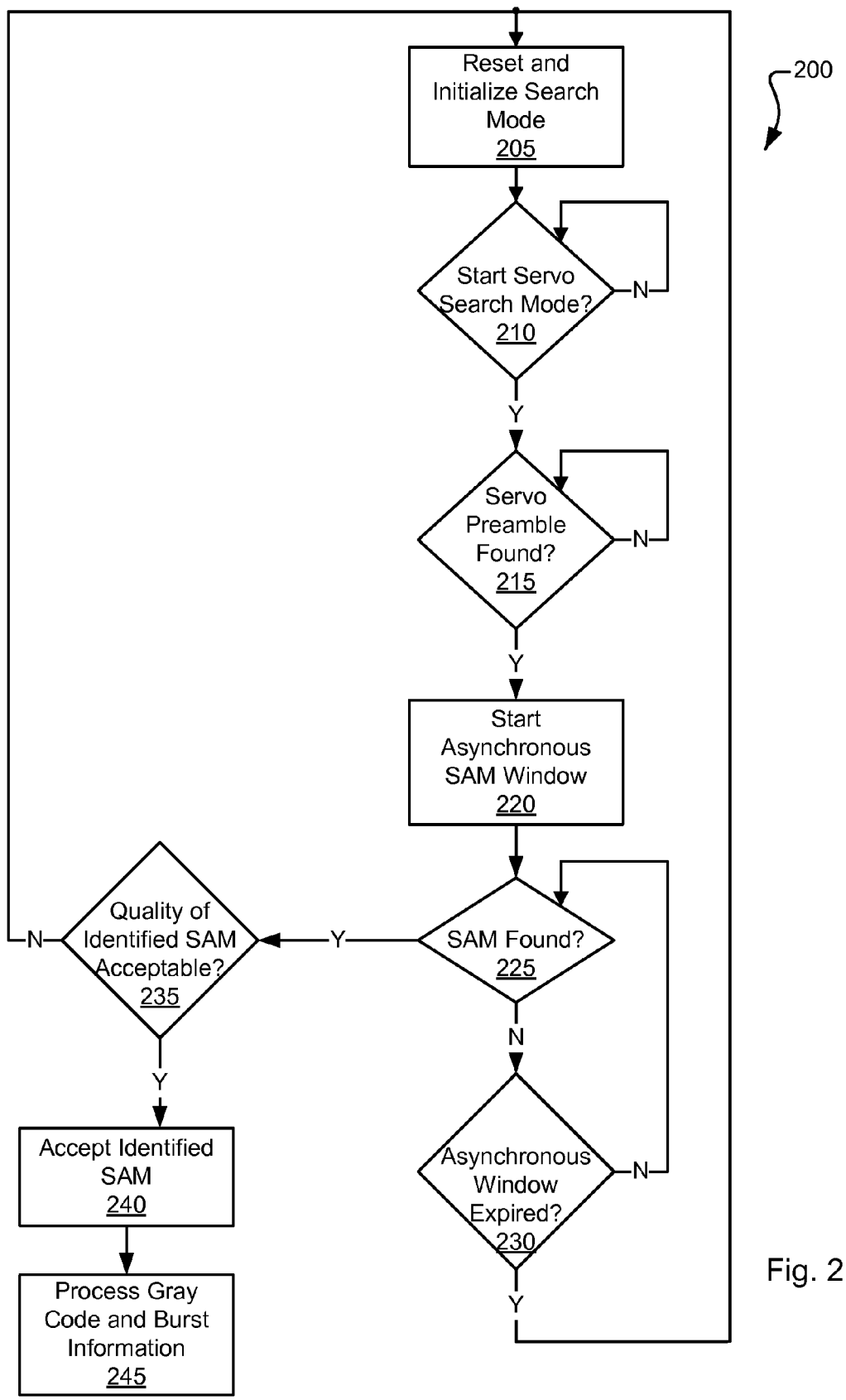
FIG. 2 is a flow diagram depicting a method in accordance with some embodiments of the present invention for reducing the incidence of false detection of sector address marks.

Turning to FIG. 2, a flow diagram 200 depicts a method in accordance with some embodiments of the present invention for reducing the incidence of falsely detected sector address marks. Following flow diagram 200, a reset and initialization of the servo search mode is done (block 205). This includes performing any preparations included in preparing to search for servo data on a storage medium. It is then determined whether the servo search mode is to be started (block 210). Where the servo search mode is to be started (block 210), a query for a servo preamble is performed on data received from the storage medium (bock 215). The process of querying for a preamble may be done using any approach known in the art for identifying a preamble pattern. Such approaches may include performing a clock recovery and gain determination based on the received preamble pattern as is known in the art. Once the end of the preamble pattern is identified (block 215), an asynchronous window is started (block 220). The sector address mark is expected a finite distance from the preamble. Thus, an asynchronous window may be used to limit the duration after the preamble where a pattern matching the sector address mark may be detected and considered a valid sector address mark. The asynchronous window may be opened and closed based upon an external command, and remains open for a programmable period of time. The programmable period of time is chosen to be sufficient for the identification of a sector address mark subsequent to the preamble. However, the further a sector address mark is found from the end of the preceding preamble the more likely it is to be a falsely detected sector address mark. Accordingly, the duration of the asynchronous window may be limited to reduce the possibility of a false sector address mark detection. More detail about the opening and closing of such an asynchronous window is provided in US Pat. Pub. No. US2005/0243455 entitled "Method and Apparatus for Improved Address Mark Detection," and filed Apr. 30, 2004 by Annampedu. The entirety of the aforementioned publication was previously incorporated herein by reference for all purposes.

The information received from the storage medium is queried to identify a predefined sector address mark (block 225). Where a sector address mark is not found (block 225), it is determined whether the asynchronous window has expired (block 230). Again, the asynchronous window may be opened and closed based upon an external command, and remains open for a programmable period of time. Once the programmable period of time expires (block 230), any pattern matching the sector address mark after the asynchronous window is closed will not be considered. Instead, a reset and initialization in preparation to restart the servo search mode is performed (block 205).

Alternatively, where a sector address mark is identified within the asynchronous window (block 225), it is determined whether the quality of the identified sector address mark is acceptable (block 235). This quality determination may be done by comparing sampling thresholds across the identified sector address mark with a programmable quality threshold value to determine whether the received signal is reliable. One particular approach for determining the quality of an identified sector address mark is discussed below in relation to FIG. 4. Where the quality of the identified sector address mark is found to be unacceptable (block 235), a reset and initialization in preparation to restart the servo search mode is performed (block 205). Alternatively, where the quality of the identified sector address mark is determined to be acceptable (block 235), the identified sector address mark is accepted (block 240). Acceptance of the sector address mark causes subsequent data to be processed in accordance with a normal processing mode. As an example, subsequent data identified by its distance from the location of the identified sector address mark is processed as Gray code data and later data also identified by its distance from the location of the sector address mark is processed as burst information (block 245). The processing of Gray code data and burst information may be done using processing techniques known in the art.

Figure 3:
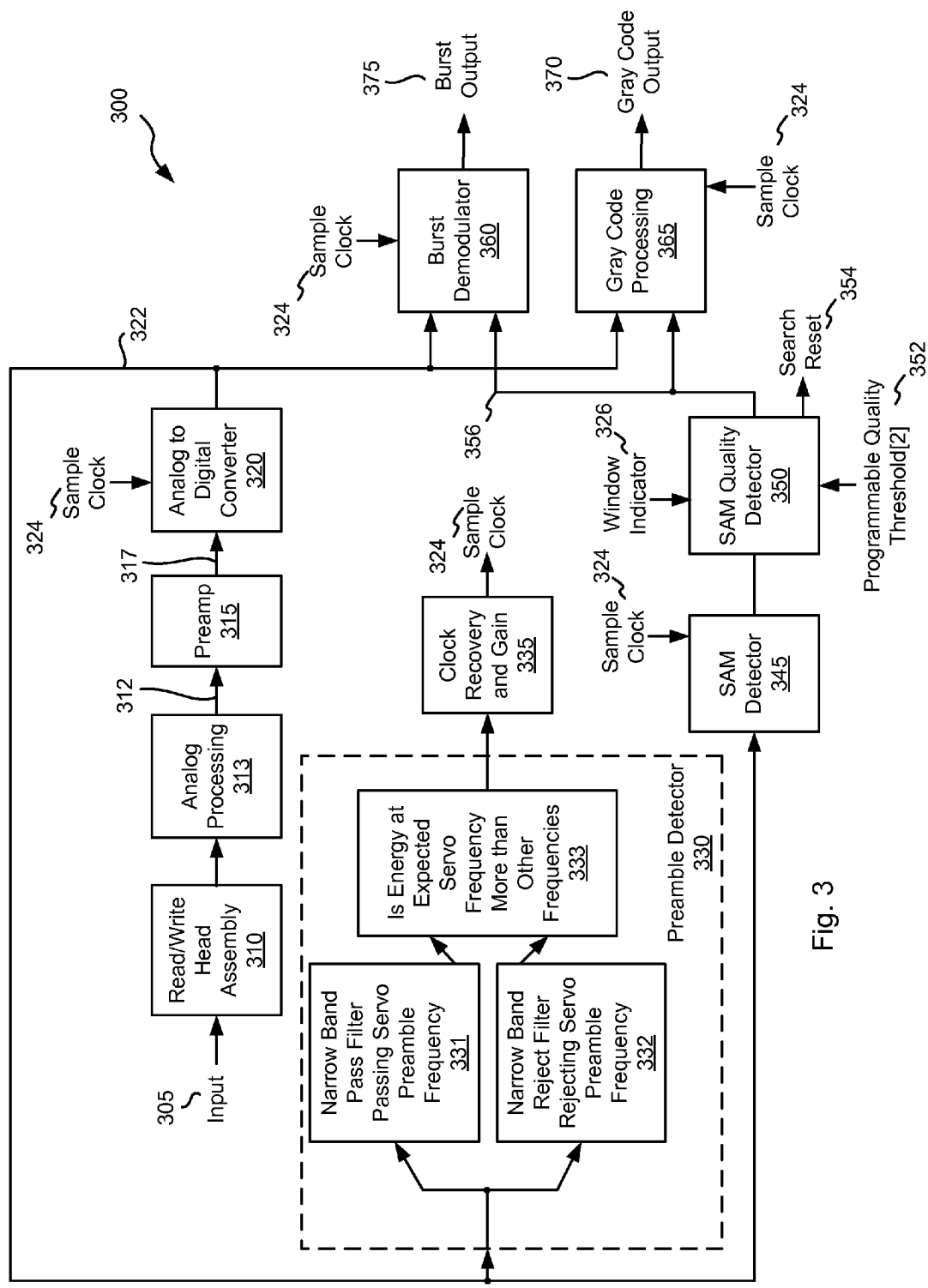
FIG. 3 is a block diagram of a circuit for processing servo data including verification of an identified sector address mark in accordance with one or more embodiments of the present invention.

Turning to FIG. 3, a block diagram of a servo data processing circuit 300 including verification of an identified sector address mark is depicted in accordance with one or more embodiments of the present invention. Servo data processing circuit 300 includes a read/write head assembly 310 that senses an input 305 from a storage medium (not shown). Read/write head assembly 310 provides an output corresponding to the sensed input 305 to an analog processing circuit 315 that, among other things, filters the received input. An output 312 is provided to a preamplifier 315 that amplifies the signal and provides an amplified output 317. Amplified output 317 is provided to an analog to digital converter 320 that samples the output synchronous to a sample clock 324 and provides a series of digital samples 322 corresponding thereto.

Digital samples 322 are provided to a preamble detector circuit 330 that is responsible for identifying a defined preamble pattern in the received information. In some cases, the defined preamble pattern is a 2T pattern as is known in the art that includes a repeating pattern of '110011001100 . . . '. It should be noted that various embodiments of the present invention may be designed to operate using different preamble patterns. In some cases, the preamble pattern may be detected by passing the received stream of information through a narrow band pass filter 331 that is designed to pass signals within a frequency range surrounding the expected frequency of the preamble pattern. Further, the received stream of information may be passed through a narrow band reject filter 332 that is designed to reject signals within the frequency range surrounding the expected frequency of the preamble pattern. Outputs of the two filters are provided to a comparator circuit 333 that compares the energy of the signal from band pass filter 331 with that from band reject filter 332. Where the energy from band pass filter 331 is sufficiently larger than that from band reject filter 332, a preamble is determined to have been found. Where a preamble is found, the identified preamble is used by a clock recovery and gain circuit 335 to adjust the phase and/or frequency of sample clock 324. Clock recovery and gain circuit 335 may be any circuit known in the art that allows for recovering a clock and gain from a received preamble pattern.

With the preamble found, digital samples 322 are queried for a defined sector address mark pattern using a SAM detector circuit 345. SAM detector circuit 345 may be any circuit known in the art that is capable of identifying a sector address mark pattern. The sector address mark detection process is in part controlled by a SAM quality detector circuit 350. SAM quality detector circuit 350 limits querying for a sector address mark to a limited asynchronous window indicated by an external window indicator signal. Such windowing may be performed as more fully described in US Pat. Pub. No. US2005/0243455 entitled "Method and Apparatus for Improved Address Mark Detection," and filed Apr. 30, 2004 by Annampedu. The entirety of the aforementioned publication was previously incorporated herein by reference for all purposes. In addition, SAM quality detector circuit 350 performs a quality analysis of any series of samples identified by SAM detector circuit 345 as a sector address mark. In some cases, this quality determination may be done by comparing sampling thresholds across the identified sector address mark with a programmable quality threshold value 352 to determine whether the received signal is reliable. In one particular case, programmable quality threshold value 352 includes two sets of values: a first set of values to which the digital samples corresponding to the detected sector address mark are compared, and a second value to which a composite output of the prior comparison is compared. Such an approach is more fully discussed below in relation to FIG. 4. Where the quality of the detected sector address mark is too low, a search reset signal 354 is asserted. Assertion of search reset signal 354 results in a restart of the servo search mode.

Alternatively, where the quality of the identified sector address mark is sufficient, a SAMFOUND and location signal 356 is asserted. Assertion of this signal causes processing of subsequent digital samples 322 to perform Gray code processing and burst mode demodulation as is known in the art. In particular, a Gray code processing circuit 365 receives signal 356, and based thereon processes digital samples 322 to generate a Gray code output 370. Gray code processing circuit 365 may be any circuit known in the art that is capable of processing Gray code information. A burst demodulator circuit 360 receives signal 356, and based thereon processes digital samples 322 to generate a burst output 375. Burst demodulator circuit 360 may be any circuit known in the art that is capable of processing burst information.

Figure 4:
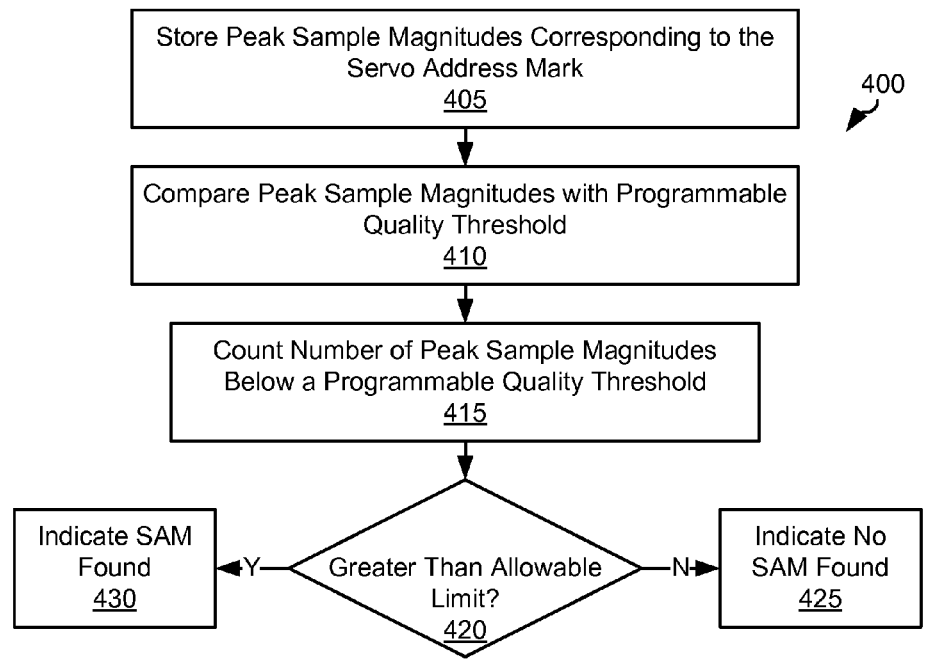
FIG. 4 is a flow diagram depicting a method for verifying an identified sector address mark using quality data in accordance with various embodiments of the present invention.

Turning to FIG. 4, a flow diagram 400 depicts a method for verifying an identified sector address mark using quality data in accordance with various embodiments of the present invention. Following flow diagram 400, peak sample magnitudes corresponding to an identified sector address mark are stored (block 405). Thus, for example, where a sector address mark is detected within digital samples of servo data processing circuit 300, the peak values of digital samples 322 are stored to a buffer. These peak sample magnitudes are compared with a programmable quality threshold (block 410). Then, the number of peak sample magnitudes less than the quality threshold are counted to determine a composite quality threshold value (block 420). This composite quality threshold value is compared with another programmable quality threshold input to determine whether the identified sector address mark should be considered to be a valid sector address mark (block 420). Where the composite quality threshold value is greater than the allowable limit (block 420), a SAMFOUND signal is asserted indicating that a sector address mark has been identified (block 430). Otherwise, where the composite quality threshold value is not greater than the allowable limit (block 420), an indication that no sector address mark has been found is asserted, and a servo search mode is restarted (block 425).

Figure 5:
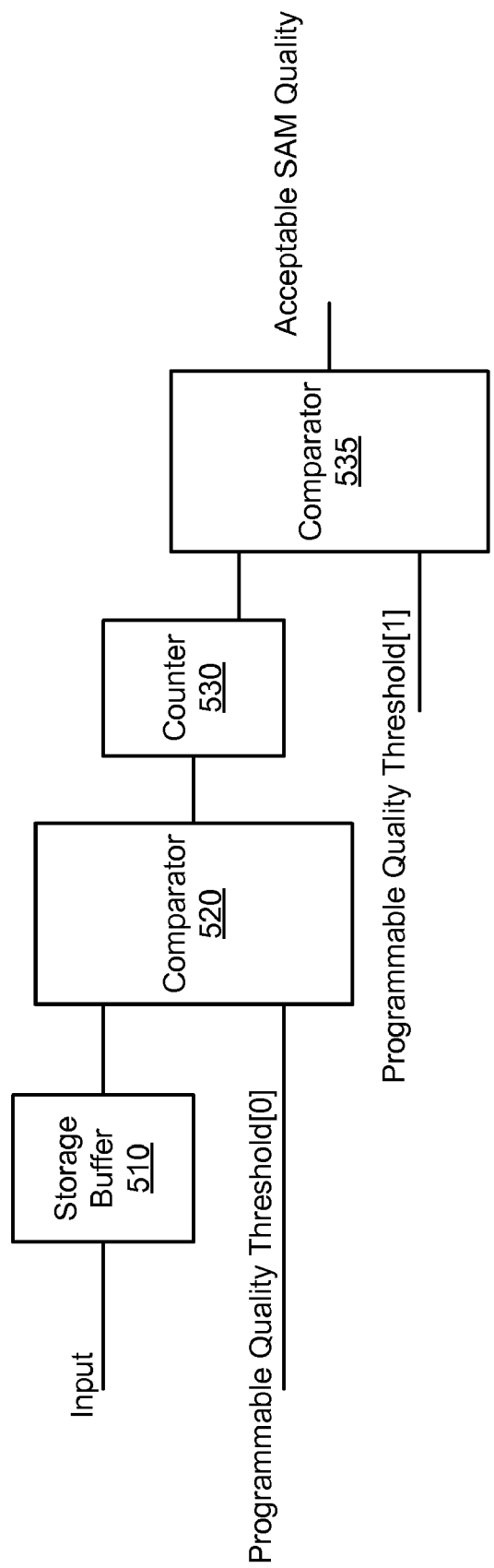
FIG. 5 is a block diagram showing a circuit for verifying an identified sector address mark using quality data in accordance with various embodiments of the present invention.

Turning now to FIG. 5, a block diagram showing a sector address mark verification circuit 500 is shown in accordance with various embodiments of the present invention. Sector address mark verification circuit 500 includes a storage buffer 510 that receives a series of peak sample magnitudes corresponding to an identified sector address mark (labeled input 505). Storage buffer 510 may be any memory known in the art including, but not limited to, a random access memory. Based on the disclosure provided herein, one of ordinary skill in the art will recognize a variety of memories that may be used. The series of peak sample magnitudes are each compared with a first programmable quality threshold 515 using a comparator 520. Where the respective stored peak sample magnitude is greater than programmable quality threshold 515, a counter 530 is incremented. Otherwise, counter 530 is not incremented. Once all of the stored peak sample magnitudes have been compared with programmable quality threshold 515 and counter 530 has been updated, the count value from counter 530 is compared with a second programmable quality threshold 540 using a comparator 535. Where the count value exceeds programmable quality threshold 540, an acceptable SAM quality signal 550 is asserted. Otherwise, acceptable SAM quality signal 550 is not asserted. As previously discussed, acceptable SAM quality signal 550 is asserted subsequent samples are processed in a normal processing mode. Otherwise, where acceptable SAM quality signal 550 is not asserted a servo search mode is restarted.

Figure 6:
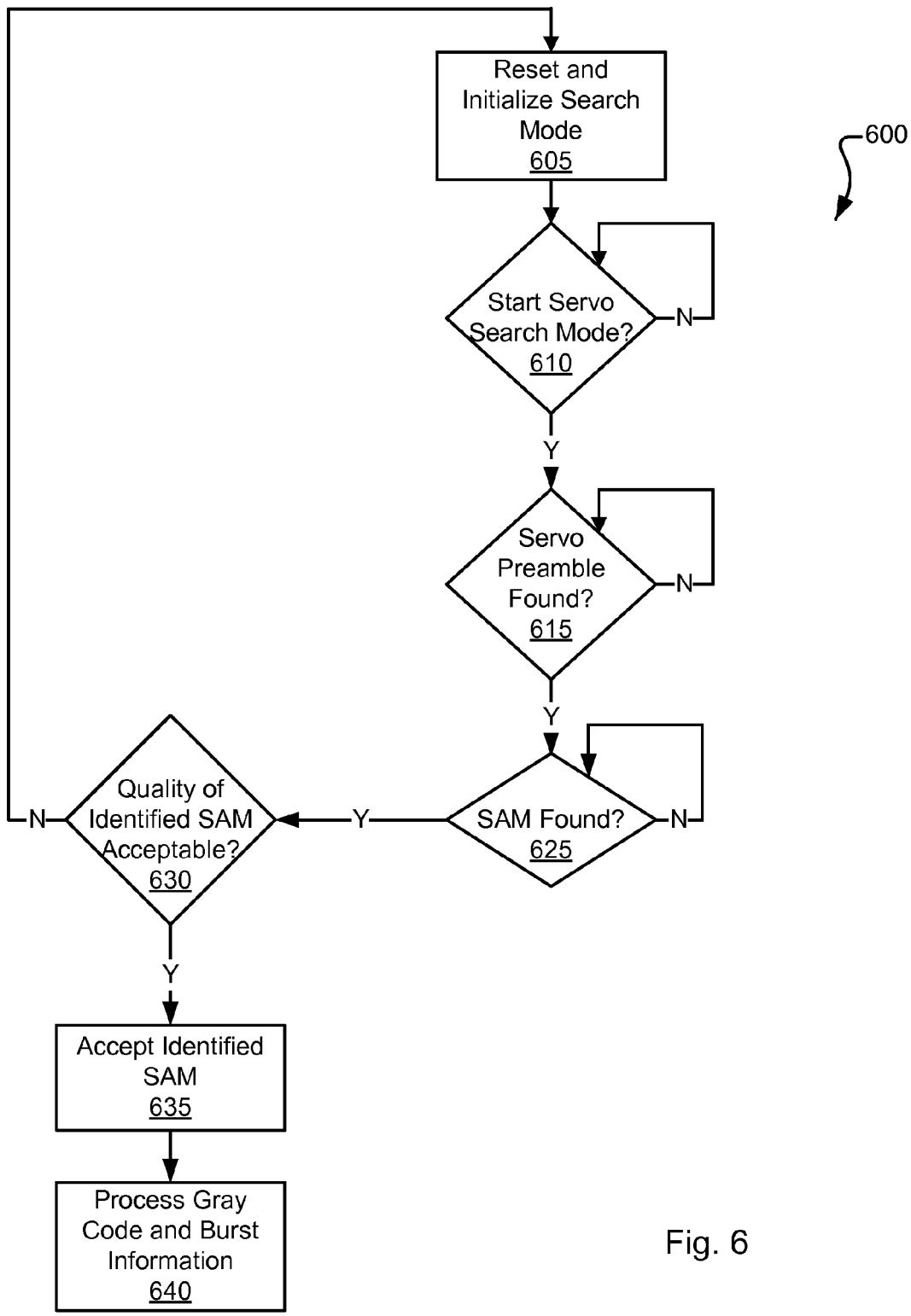
FIG. 6 is a flow diagram depicting a method in accordance with various embodiments of the present invention for reducing the incidence of false detection of sector address marks.

Turning to FIG. 6, a flow diagram 600 depicts a method in accordance with some embodiments of the present invention for reducing the incidence of falsely detected sector address marks. Following flow diagram 600, a reset and initialization of the servo search mode is done (block 605). This includes performing any preparations included in preparing to search for servo data on a storage medium. It is then determined whether the servo search mode is to be started (block 610). Where the servo search mode is to be started (block 610), a query for a servo preamble is performed on data received from the storage medium (bock 615). The process of querying for a preamble may be done using any approach known in the art for identifying a preamble pattern. Such approaches may include performing a clock recovery and gain determination based on the received preamble pattern as is known in the art.

Once the preamble pattern is identified (block 615), attention is turned to identifying a sector address mark that would be expected to be received a finite distance from the preamble (block 625). Querying for the sector address mark may be done using any sector address mark identification approach known in the art. The process of searching for a sector address mark continues for some period until the process is either interrupted or a sector address mark is identified (block 625). Once a sector address mark is identified (block 625), it is determined whether the quality of the identified sector address mark is acceptable (block 630). This quality determination may be done by comparing sampling thresholds across the identified sector address mark with a programmable quality threshold value to determine whether the received signal is reliable. One particular approach for determining the quality of an identified sector address mark is discussed below in relation to FIG. 4. Where the quality of the identified sector address mark is found to be unacceptable (block 630), a reset and initialization in preparation to restart the servo search mode is performed (block 605). Alternatively, where the quality of the identified sector address mark is determined to be acceptable (block 630), the identified sector address mark is accepted (block 635). Acceptance of the sector address mark causes subsequent data to be processed in accordance with a normal processing mode. As an example, subsequent data identified by its distance from the location of the identified sector address mark is processed as Gray code data and later data also identified by its distance from the location of the sector address mark is processed as burst information (block 640). The processing of Gray code data and burst information may be done using processing techniques known in the art.

Figure 7:
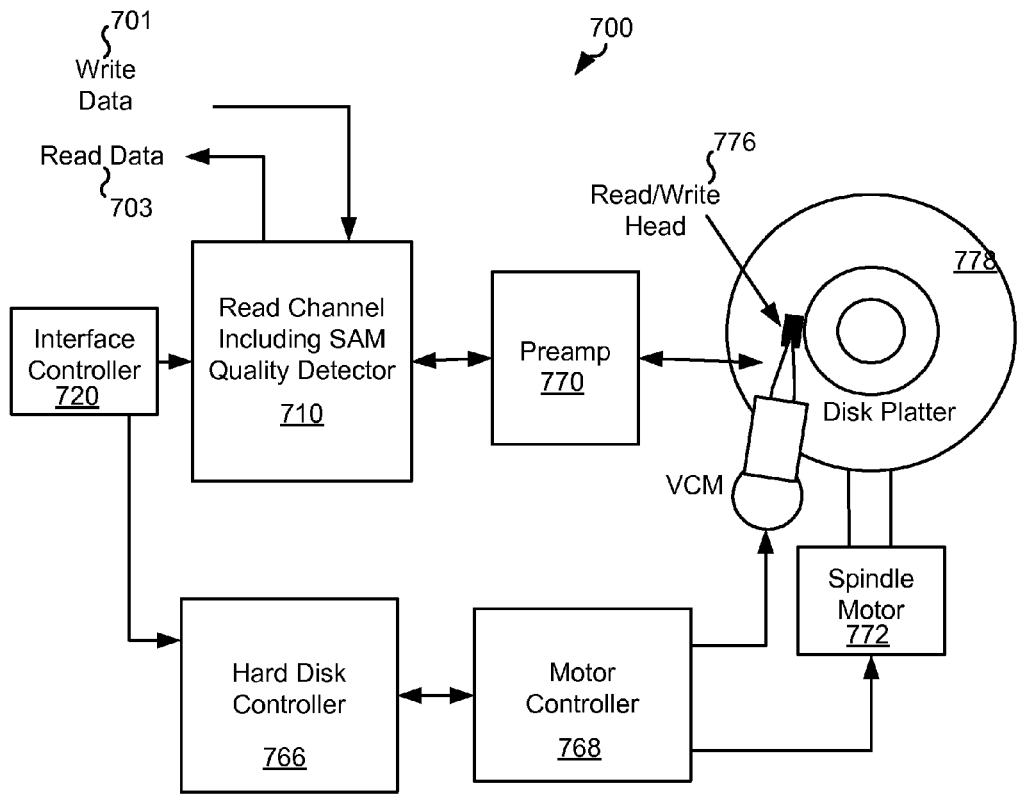
FIG. 7 depicts a storage device including a read channel with a sector address mark quality detector in accordance with one or more embodiments of the present invention.

Turning to FIG. 7, a storage system 700 including a read channel 710 with a sector address mark quality detector is depicted in accordance with various embodiments of the present invention. Storage system 700 may be, for example, a hard disk drive. Read channel 710 includes sector address mark quality detector similar to those described above in relation to FIGS. 2, 3 and 6. Further, read channel 710 includes a data detector, such as, for example, a Viterbi algorithm data detector. In addition to read channel 710, storage system 700 includes a preamplifier 770 that amplifies a minute electrical signal received from a read/write head assembly 776. Read/write head assembly is disposed in relation to a disk platter 778. Storage system 700 also includes an interface controller 720, a hard disk controller 766, a motor controller 768, and a spindle motor 772. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with a perpendicular recording scheme. In other embodiments of the present invention, disk platter 778 includes magnetic signals recorded in accordance with a longitudinal recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel 710 via preamplifier 770. Preamplifier 770 is operable to amplify the minute analog signals accessed from disk platter 778. In turn, read channel 710 decodes and digitizes the received analog signal to recreate the information originally written to disk platter 778. This data is provided as read data 703 to a receiving circuit. A write operation is substantially the opposite of the preceding read operation with write data 701 being provided to read channel module 710. This data is then encoded and written to disk platter 778.

In conclusion, the invention provides novel systems, devices, methods and arrangements for sector address mark detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data detection system, the data detection system comprising:
   a sector address mark detection circuit operable to receive a data stream and to identify a sector address mark in the data stream; and
   a sector address mark quality detection circuit operable to compare a first sample corresponding to the sector address mark in the data stream with a quality threshold to provide a first result and to compare a second sample corresponding to the sector address mark in the data stream with the quality threshold to provide a second result.

2. The data detection system of claim 1, wherein the data detection system further comprises:
   a preamble detection circuit, wherein the preamble detection circuit is operable to identify a preamble pattern in the data stream.

3. The data detection system of claim 2, wherein the data detection system further comprises:
   a clock recovery circuit, wherein the clock recovery circuit is operable to adjust the phase of a sample clock based on the identified preamble pattern.

4. The data detection system of claim 1, wherein the data stream is a series of digital samples derived from a storage medium.

5. The data detection system of claim 4, wherein the storage medium includes a servo data region and a user data region, and wherein the servo data region includes servo data.

6. The data detection system of claim 1, wherein the sector address mark quality detection circuit includes a comparator circuit operable to: perform the comparison of the first sample with the quality threshold, perform the comparison of the second sample with the quality threshold.

7. The data detection system of claim 6, wherein the comparator circuit is a first comparator circuit, wherein the quality threshold is a first quality threshold, and wherein the sector address mark quality detection circuit further includes:
   a second comparator circuit operable to compare a composite of the first result and the second result with a second quality threshold.

8. The data detection system of claim 7, wherein the composite of the first result and the second result includes an indication of the number of the first result and the second result that are at a defined state.

9. The data detection system of claim 7, wherein the composite of the first result and the second result provides an indication of the number of the first sample and the second sample that exceed the quality threshold.

10. The data detection system of claim 7, wherein the composite of the first result and the second result provides an indication of the number of the first sample and the second sample that are below the quality threshold.

11. A method for performing data detection, the method comprising:
    receiving a data stream;
    querying the data stream for a preamble pattern;
    detecting the preamble pattern in the data stream;
    detecting a sector address mark in the data stream;
    comparing the detected sector address mark against a quality threshold; and
    wherein the sector address mark is below the quality threshold, restarting the query for the preamble.

12. The method of claim 11, the method further comprising:
    where the sector address mark is above the quality threshold, treating a subsequent portion of the data stream as servo data.

13. The method of claim 12, wherein the servo data includes a Gray code pattern and burst information.

14. The method of claim 11, wherein comparing the sector address mark against the quality threshold includes:
    comparing a first sample from the data stream against the quality threshold to provide a first result; and
    comparing a second sample from the data stream against the quality threshold to provide a second result.

15. The method of claim 14, wherein the quality threshold is a first quality threshold, and wherein the method further comprises:
    combining the first result with the second result to make a composite result; and
    comparing the composite result with a second quality threshold.

16. The method of claim 15, wherein combining the first result with the second result includes, summing at least the number of the first result and the second result that are at a defined threshold.

17. The method of claim 11, wherein the data stream is a series of digital samples derived from a storage medium.

18. The method of claim 17, wherein the storage medium includes a servo data region and a user data region, and wherein the servo data region includes servo data.

19. The method of claim 11, wherein the method further comprises:
    recovering a sample clock using the detected preamble.

20. A storage device, the storage device comprising:
    a storage medium, wherein the storage medium includes a sector address mark;
    an analog front end, wherein the analog front end is operable to sense information on the storage medium and to provide a series of digital samples corresponding to the information on the storage medium;
    a sector address mark detection circuit, wherein the sector address mark detection circuit is operable to receive the series of digital samples and to identify the sector address mark in the series of digital samples; and
    a sector address mark quality detection circuit, wherein the sector address mark quality detection circuit is operable to receive a first sample and a second sample from the series of digital samples corresponding to the sector address mark, and to determine a quality of the identified sector address mark based at least in part on a comparison of the first sample and the second sample with a quality threshold.

21. The storage device of claim 20, wherein the quality threshold is a first quality threshold, and wherein the sector address mark quality detection circuit includes:
    a first comparator, wherein the first comparator is operable to compare the first sample with the first quality threshold to provide a first result, and wherein the first comparator is operable to compare the second sample with the first quality threshold to provide a second result; and
    a second comparator, wherein the second comparator is operable to compare a composite of the first result and the second result with a second quality threshold.

22. The storage device of claim 21, wherein the composite of the first result and the second result includes an indication of the number of the first result and the second result that are at a defined state.

* * * * *